United States Patent Office 3,810,874
Patented May 14, 1974

3,810,874
POLYMERS PREPARED FROM POLY(PERFLUORO-ALKYLENE OXIDE) COMPOUNDS
Ronald A. Mitsch, Little Canada, and Joseph La Mar Zollinger, Maplewood, Minn., assignors to Minnesota Mining and Manufacturing Company, St. Paul, Minn.
No Drawing. Continuation-in-part of application Ser. No. 805,885, Mar. 10, 1969. This application Sept. 8, 1970, Ser. No. 70,540
Int. Cl. C08g 17/04, 22/02, 22/16
U.S. Cl. 260—75 H       5 Claims

ABSTRACT OF THE DISCLOSURE

Polymeric materials having a backbone comprising segments containing poly(perfluoroalkylene oxide) having the structure

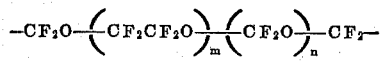

Possessing unusual low temperature flexibility as well as generally good high temperature stability and resistance to solvents. Monomeric precursors and methods of preparation of said precursors and polymeric materials are described. The polymers are useful as films, sealants, binders and as molded and extruded articles such as gaskets, O-rings, and hose-linings for cryogenic applications.

---

This application is a continuation-in-part of our prior filed application U.S. Ser. No. 805,885, filed Mar. 10, 1969, the entire disclosure of which is incorporated herein by reference.

This invention relates to polyfunctional poly(perfluoroalkylene oxides) and their preparation. In another aspect, it relates to their use in the preparation of polymers such as polyurethanes, polyureas, polysiloxanes, polyesters, polycyanurates, polytriazines, polyamides, polyimides and others.

In the aerospace industry, for example, there are many applications in which sealants, gaskets, O-rings, solid propellant binders, etc. must have low temperature flexibility, high temperature stability, solvent resistance and thermal and oxidative stability. Although recent prior art materials have been described which exhibit some of the above properties, there have not heretofore been provided polymers which satisfy the above requirements and additionally have satisfactory low temperature flexibility.

This invention provides novel polyfunctional-terminated poly(perfluoroalkylene oxides) which are very useful for the preparation of novel polymers having unexpectedly low glass transition temperatures and are flexible at low temperature, and which possess solvent resistance and good hydrolytic, thermal and oxidative stability.

In accordance with the invention there are provided linear polyfunctional-terminated poly(perfluoroalkylene oxide) compounds of the formula

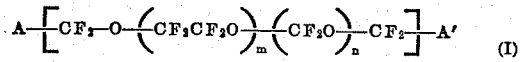  (I)

where A and A' are reactive radicals, preferably organic, bonded to a terminal —CF$_2$— group (as shown) and $m$ and $n$ designate the number of randomly distributed perfluoroethyleneoxy and perfluoromethyleneoxy backbone repeating subunits, respectively, the ratio $m/n$ being 0.2/1 to 5/1, said compounds having a number average molecular weight $\bar{M}n$, in the range of 500 to 20,000 or higher, preferably 800 to 15,000. The compounds of this formula can be homopolymerized or copolymerized for the preparation of thermally stable, solvent resistant polymers such as polyurethanes, polyesters, polysiloxanes, polyamides and others. The glass transition temperatures, $T_g$, of Formula I compounds are in general lower than —78° C. and preferably lower than —100° C., and can be as low as —125° C. or even lower, e.g., —130° C. These advantageously low glass transition temperatures are also characteristic of the polymers prepared from said compounds and can be further lowered by increasing the oxygen/fluorine content in the compounds or by increasing the length of the poly(perfluoroalkylene oxide) segment.

While the segment-terminating radicals are usually and preferably —CF$_2$—, segments containing —C$_2$F$_4$—, —C$_3$F$_6$— or similar perfluoroalkylene radicals can be prepared and have essentially the same properties as do the —CF$_2$— terminating segments.

The backbone of the compounds of Formula I is terminated by perfluoromethylene groups bearing a polymerization functional group linked to said perfluoromethylene groups by divalent radicals free of non-aromatic double bonds.

Preferably A and A' in the polyfunctional-terminated poly(perfluoroalkylene oxide) compound are —X$_a$YZ$_b$ or —X'$_{a'}$Y'Z'$_{b'}$, respectively, where X and X' are each a polyvalent, preferably divalent, linking organic radicals such as —CONR—, —CO$_2$—, —COS—, —CO—,

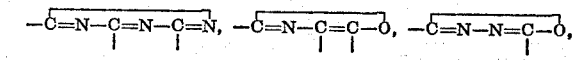

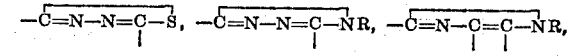

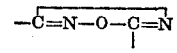

$a$ and $a'$ are zero or one (and can be the same or different), $b$ and $b'$ are integers of 1–3 (and can be the same or different). R is hydrogen, lower alkyl (e.g., CH$_3$, —CH$_2$CF$_3$, —C$_6$H$_{13}$), aryl of less than 13 carbon atoms (e.g., —C$_6$H$_5$, —C$_6$H$_4$CH$_3$, C$_{10}$H$_7$) or —YZ$_b$ radical. Y and Y' are polyvalent linking organic radicals free of olefinic unsaturation such as alkylene (e.g., —CH$_2$—, —C$_2$H$_4$—), oxa-alkylene (e.g., —CH$_2$OCH$_2$—), cycloalkylene (e.g. —c=C$_6$H$_{10}$—), thia-alkylene (e.g., —CH$_2$SCH$_2$—), arylene (e.g. —C$_6$H$_4$—,

—C$_6$H$_4$OC$_6$H$_4$—), and the like, or combinations thereof, such as aralkylene and alkarylene. Z and Z' are polymerizable functional groups which can vary such as —OH, —SH, —SR', —NR$_2$', —CO$_2$H, —SiR'$_d$Q$_{3-d}$, —CN, —NCO

—CO$_2$R', —OSO$_2$CF$_3$, —OCOCl, —OCN, —N(R')CN, —(O)COC(O), —N=C, —I, —CHO, —CH(OCH$_3$)$_2$, —SO$_2$Cl, —C(OCH$_3$)=NH, —C(NH$_2$)=NH,

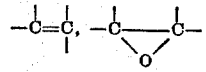

and the like, wherein R' is hydrogen, aryl, or lower alkyl, Q is halogen, —OR', —OCOR', or —CH=CH$_2$; and $d$ is 0 or an integer of 1 to 3. Z and Z' may also be —OCR$_1$R$_2$R$_f$ or

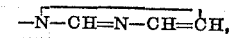

wherein R$_1$ is hydrogen, lower alkyl or lower fluoroalkyl, R$_2$ is hydrogen or lower alkyl and R$_f$ is lower fluoroalkyl. The polymerizable functional group in A and A' is one which will undergo electrophilic, nucleophilic, or free radical reaction to form a polymeric product.

Thus, the linear functional-terminated poly(perfluoroalkylene oxide) compounds of Formula I can be polymerized or copolymerized to form polymers comprising recurrent backbone units of the formula

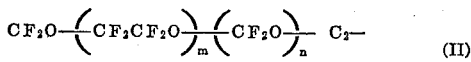     (II)

and organic linking radicals where $m$ and $n$ designate the number of randomly distributed perfluoroethyleneoxy and perfluoromethyleneoxy backbone repeating subunits, respectively, the ratio $m/n$ being 0.2/1 to 5/1, preferably 0.5/1 to 2/1, wherein said recurrent backbone units are joined by said organic linking radicals attached through a carbon, oxygen, sulfur or nitrogen atom thereof contained in a chain of not fewer than 3 atoms. Typically, the polymers have a molecular weight of at least 1100, preferably at least 5000, and frequently as high as 2,000,000 or more.

The linear polyfunctional-terminated poly(perfluoroalkylene oxide) compounds of Formula I are conveniently prepared, for example, from the ester, carboxy, or acyl halide-terminated precursors which are shown and described along with their preparation in Italian Pat. No. 817,809, incorporated herein by reference.

The linear hydroxy-terminated poly(perfluoroalkylene oxides), useful as prepolymers in the preparation of polymers such as the polurethanes shown and described in parent application Ser. No. 805,885, incorporated herein by reference, can be prepared, for example, by reduction of their ester-, carboxy- or acyl halide-terminated precursors, or they can be prepared by reaction of said ester- or acyl halide-terminated precursors with, for example, amino alcohols. The method of preparing said prepolymers and the method of preparing polyurethanes from said prepolymers and polyisocyanate reactants are also shown and described in parent application Ser. No. 805,885.

Hydroxy terminated poly(perfluoroalkylene oxides) having more than two terminal hydroxy groups can be prepared, for example, by reacting the dimethylol-terminated compound with up to two molar equivalents of 2,3-epoxy-1-propanol in the presence of a basic catalyst. Such polyhydroxy derivatives are useful as compatible cross-linking components in the preparation of urethane polymers.

Other compounds of Formula I are prepared from the acid, ester, or acyl halide terminated poly(perfluoroalkylene oxides) by known reactions, as indicated in Table I.

TABLE I

| | $-X_aYZ_b$ | Reactant |
|---|---|---|
| 1 | $-CONHCH_2-CH=CH_2$ | $H_2NCH_2-CH=CH_2$ |
| 2 | $-CONH(CH_2)_3CO_2H$ | $H_2N(CH_2)_3CO_2H$ |
| 3 | $-CON(CH_3)CH_2CH_2OH$ | $HN(CH_3)CH_2CH_2OH$ |
| 4 | $-CONHCH_2CH_2NH_2$ | $H_2NCH_2CH_2NH_2$ |
| 5 | $-CONHCH_2CH_2SH$ | $H_2NCH_2CH_2SH$ |
| 6 | $-CONH(CH_2)_3Si(OCH_3)_3$ | $H_2N(CH_2)_3Si(OCH_3)_3$ |
| 7 | $-CONH-C_6H_4-OH$ | $H_2N-C_6H_4-OH$ |
| 8 | $-CONH-C_6H_4-CH_2CO_2H$ | $H_2N-C_6H_4-CH_2CO_2H$ |
| 9 | $-CONH-C_6H_3(OH)_2$ | $HO-C_6H_3(OH)-NH_2$ |
| 10 | $-CONH-C_6H_4-Si(CH_3)_2OC_2H_5$ | $H_2N-C_6H_4-Si(CH_3)_2OC_2H_5$ |
| 11 | $-CONH-C_6H_4-CH_2CH=CH_2$ | $H_2N-C_6H_4-CH_2CH=CH_2$ |
| 12 | $-CONH-C_6H_3(NCO)-CH_3$ | $OCN-C_6H_3(NCO)-CH_3$ |
| 13 | $-CONH-C_6H_4-O-C_6H_4-NCO$ | $OCN-C_6H_4-O-C_6H_4-NCO$ |
| 14 | $-CONH-C_6H_4-CH_2-C_6H_4-NCO$ | $OCN-C_6H_4-CH_2-C_6H_4-NCO$ |
| 15 | benzoxazole-OH | (1) $H_2N-C_6H_3(HO)-OH$; (2) Heat |
| 16 | benzimidazole-C_6H_3(NH_2)-NH_2 | (1) $H_2N-C_6H_3(NH_2)-NH_2$, $H_2N$-; (2) Heat |

TABLE I—Continued

| | —X_aYZ_b | Reactant |
|---|---|---|
| 17 | benzothiazole-6-CO_2H (C=N fused with S-containing ring, -CO_2H substituent) | (1) $H_2N$-C_6H_3(SH)-CO_2H<br>(2) Heat |
| 18 | oxadiazole with -C=CH_2 and -CH_3 substituents | (1) $H_2NNHCOC(CH_3)=CH_2$<br>(2) Dehydration |
| 19 | —CO_2CH_2C(CH_3)_2CH_2OH | HOCH_2C(CH_3)_2CH_2OH |
| 20 | —CO_2CH_2CH(OH)CH_3 | $CH_3CH\underset{O}{-\!\!-\!\!-}CH_2$ (propylene oxide) |
| 21 | —CO_2CH_2CH=CH_2 | CH_2=CHCH_2OH |
| 22 | —CN | (1) NH_3<br>(2) Dehydration |
| 23 | pyrimidine with -CH=CH_2 and -CF_3 substituents | (1) NH_3<br>(2) Dehydration<br>(3) $N_2N-C(=NH)-CF_3$<br>(4) (CH_2=CHCO)_2O |
| 24 | —CH_2OH | LiAlH_4 |
| 25 | —CH_2OCH_2CH(OH)CH_2OH | Compound 24 plus $CH_2\underset{O}{-\!\!-\!\!-}CHCH_2OH$ |
| 26 | —CH_2OCH_2CH—CH_2 (epoxide) | Compound 24 plus $CH_2\underset{O}{-\!\!-\!\!-}CHCH_2Br$ |
| 27 | —CH_2OCH_2CH=CH_2 | Compound 24 plus CH_2=CHCH_2Br |
| 28 | —CH_2OCO-C_6H_4-NH_2 | Compound 24 plus isatoic anhydride (benzo-fused ring with NH-C(=O)-O-C(=O)) |
| 29 | —CH_2OSO_2CF_3 | Compound 24 plus CF_3SO_2F plus (C_2H_5)_3N |
| 30 | —CH_2OCN | Compound 24 plus NCCl plus (C_2H_5)_3N |
| 31 | —CH_2O-C_6H_4-NH_2 | (1) Compound 29 plus NaO-C_6H_4-NO_2<br>(2) H_2 |
| 32 | —CH_2O-C_6H_4-NCO | Compound 31 plus COCl_2 |
| 33 | —CH_2O- (phthalic anhydride group) | (1) Compound 29 plus NaO-C_6H_3(CO_2CH_3)_2<br>(2) Hydrolysis<br>(3) (CH_3CO)_2O |
| 34 | —CH_2O-C_6H_4-O-C_6H_4-OCN | (1) Compound 29 plus NaO-C_6H_4-O-C_6H_4-OH<br>(2) ClCN + (C_2H_5)_3N |
| 35 | —CH_2NH_2 | Compound 29 plus NH_3 |
| 36 | —CH_2NCO | Compound 35 plus COCl_2 |
| 37 | —CH_2NHCH_3 | Compound 29 plus CH_3NH_2 |
| 38 | —CH_2N (norbornene dicarboximide) | Compound 35 plus norbornene dicarboxylic anhydride |

TABLE I—Continued

| | $-X_aYZ_b$ | Reactant |
|---|---|---|
| 39 | 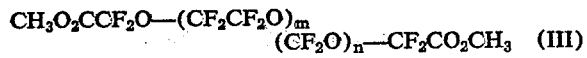 | Compound 38 plus $HSi(CH_3)_2OCOCH_3$ plus $H_2PtCl_6$ |
| 40 | $-CH_2OCOC(CH_3)=CH_2$ | Compound 24 plus $CH_2=C(CH_3)COCl$ |
| 41 | $-CH_2I$ | Compound 29 plus NaI |
| 42 | $-CH_2SH$ | (1) Compound 29 plus $CH_3COSNa$ (2) Hydrolysis |
| 43 | $-CH_2\overset{+}{N}\equiv\overset{-}{C}$ | (1) Compound 35 plus $HCO_2CH_3$ (2) $COCl_2$ plus $(C_2H_5)_3N$ |
| 44 | $-NCO$ | (1) $NaN_3$ (2) Heat |
| 45 | $-COC_6H_5$ | $Cd(C_6H_5)_2$ |
| 46 | $-C(CH_3)_2OH$ | (1) $CH_3MgBr$ (2) $H^+$ |
| 47 | $-CHO$ | $LiAlH_4$ |
| 48 | $-C(CH_3)=CH_2$ | Compound 46 plus $P_2O_5$ |
| 49 | $-CH_2N(CN)CH_3$ | Compound 37 plus ClCN plus $(C_2H_5)_3N$ |
| 50 | $-I$ | (1) $Ag_2O$ (2) $I_2$ |
| 51 | $-CH=CH_2$ | Compound 47 plus $CH_2=P(C_6H_5)_3$ |
| 52 | $-C(OCH_3)=NH$ | Compound 22 plus $CH_3OH$ plus $(C_2H_5)_3N$ |
| 53 | $-CH_2-SO_2Cl$ | Compound 42 plus $Cl_2$ plus $H_2O$ |
| 54 | $-CH(OCH_3)_2$ | Compound 47 plus $CH_3OH$ plus acid |
| 55 | $-C(NH_2)=NH$ | Compound 22 plus $NH_3$ |
| 56 | 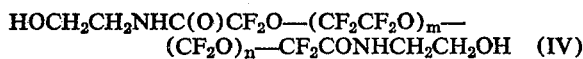 | Compound 29 plus NaO–⟨C₆H₄⟩–O–⟨C₆H₅⟩ |
| 57 | $-CH_2O$–⟨C₆H₄⟩–O–⟨C₆H₄⟩–$SO_2Cl$ | Compound 56 plus $ClSO_3H$ |
| 58 | 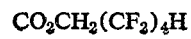 | Compound 22 plus $HN_3$ |

Compounds 1 to 6, inclusive, of Table I, aliphatic amides, can generally be prepared by reaction of a parent methyl ester $$CH_3O_2CCF_2O-(CF_2CF_2O)_m(CF_2O)_n-CF_2CO_2CH_3 \quad (III)$$

with an amino-substituted compound, as specifically illustrated in Example I hereinafter.

Further description of the preparations of said functionally-terminated poly(perfluoroalkylene oxides) will be omitted in the interest of brevity since in most cases they follow classical methods, such as described in "Organic Functional Group Preparations," by Sandler & Karo, Academic Press, Inc., New York, N.Y. (1968).

The functionally-terminated poly(perfluoroalkylene oxides) of this invention, in addition to their utility as prepolymers for the preparation of polymers, are also useful as lubricants, viscosity index additives for perhalogenated lubricants, hydraulic fluids, water and oil repellants, surface active agents, anti-corrosion agents, antistick or release agents for molds, flotation agents, and plasticizers for fluorinated plastics.

Objects and advantages of this invention are further illustrated by the following examples but the various materials used in these examples, conditions of reactions, and other details, should not be construed to limit this invention.

EXAMPLE I

In this example, an ethylol-substituted, amide-terminated prepolymer was prepared by slowly adding and stirring 0.9 g. of ethanolamine to 10.2 g. of a methyl diester precursor of Formula III ($\bar{M}n=1400$ and $m/n=1.55$). After stirring the mixture for 1 hr., infrared analysis indicated complete conversion of the diester precursor to the amide-terminated prepolymer. The reaction mixture was dissolved in 125 ml. diethyl ether, washed with 3–10 ml. portions of water, and dried over calcium sulfate. Removal of the calcium sulfate and ether yielded 9.5 g. of the pale yellow prepolymer having the structure $$HOCH_2CH_2NHC(O)CF_2O-(CF_2CF_2O)_m-(CF_2O)_n-CF_2CONHCH_2CH_2OH \quad (IV)$$

confirmed by its infrared spectrum.

EXAMPLE II

Compounds 7 to 11, inclusive, of Table I, aromatic amides, can be prepared by reaction of an activated ester with an aromatic amine, as specifically illustrated in this example.

To a mixture of 200 g. (0.38 mole) of the dimethylester of Formula III (Mn, 2100; $m/n$, 0.6) and 200 g. (0.86 mole) of 1,1,5-trihydrooctafluoropentyl alcohol in a 500 ml. glass flask is added 10 drops of sulfuric acid (conc.) and 1.5 ml. of trifluoromethanesulfonic anhydride as transesterification catalysts. The mixture was refluxed for ten days with 0.5 ml. additional anhydride catalyst being added on the first, second, third and sixth days. Five ml. of distillate was removed through a 30 cm. Vigreux column on the seventh and eighth days. Part of the fluorinated pentyl alcohol was removed by distillation. The lower liquid layer of the pot residue was heated (140° C.) at aspirator pressure, then cooled, dissolved in 1,1,2-trichlorotrifluoroethane, treated with activated charcoal, filtered and the solvents removed under reduced pressure with final heating at full oil pump vacuum for 16 hrs. on the steam bath. The colorless liquid ester product weighed 183 g. The carbonyl peak for the ester end group, $$CO_2CH_2(CF_2)_4H$$

is at 5.49 microns, consistent with a product of Structure V:

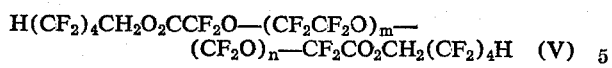

Proton nuclear magnetic resonance analysis showed peaks at 4.03τ (triple triplet) and 5.22τ (triplet) consistent for —CF$_2$H and —OCH$_2$CF$_2$, respectively.

To a 100 ml. glass flask fitted with reflux condenser and drying tube was placed 22.0 g. (0.01 mole) of the diester of Formula V and 6.0 g. of 4—NH$_2$—4'—OH—diphenyl ether. After refluxing overnight and removal of solvent, the residual product was dissolved in diethyl ether and extracted with 0.2 N hydrochloric acid and water. After drying over calcium sulfate, filtration and removal of solvent 16.5 g. of a pale orange crystalline solid, M.P. 110–113° C., was obtained. This amido phenol is soluble in diethyl ether, acetone and acetonitrile at room temperature. It is insoluble in 1,1,2-trichlorotrifluoroethane and chloroform. Proton NMR and infrared spectra support the proposed structure, Formula VI. Infrared peaks are at 3.04 and 5.84 microns for NH, OH and C=O, respectively.

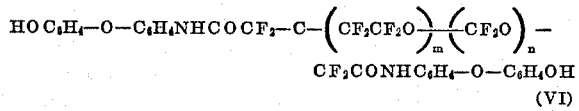

EXAMPLE III

Amides free of isocyanate-reactive hydrogen atoms, such as Compounds 12 to 14, inclusive of Table I can conveniently be prepared from dicarboxylic polyester:

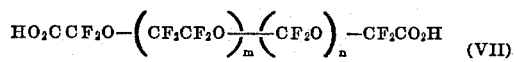

in accordance with this example.

To a refluxing solution of 90 g. of toluene-2,4-diisocyanate in 150 ml. of xylene hexafluoride in a 500 ml. glass flask was added, over a two hour period, 50 g. of a dicarboxylic acid of Formula VII ($\overline{M}n$=2700, $m/n$=0.6) in 25 ml. of xylene hexafluoride. Refluxing was continued for two days to complete the reaction and to eliminate carbon dioxide. Most of the solvent was removed by distillation and the cooled reaction mixture washed four times with petroleum ether. The pure isocyanate-amide end-capped liquid polymer (42 g.) was isolated by pumping under good vacuum at room temperature.

Infrared absorptions at 3.05 and 6.5 microns for NH, 4.40 microns for NCO, and 5.87 microns for C=O, are consistent with the structure:

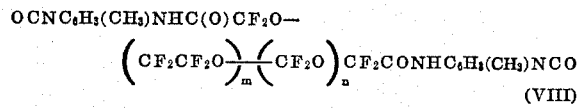

Polycarbodiimides can be prepared from isocyanate terminated poly(perfluoroalkylene oxides) by condensation in the presence of 1-phenyl-3-methyl-3-phospholene oxide as catalyst at 25–100° C.

EXAMPLE IV

A useful class of poly(perfluoroalkylene oxides) is those terminated by 5 membered heterocyclic rings including the radical

wherein G represents an atom of oxygen, nitrogen, or sulfur. Certain of these, such as Compounds 15, 16, and 17 of Table I, which contain the structure:

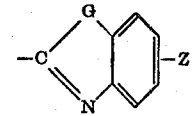

can be prepared by dehydration of the corresponding orthosubstituted carboxanilide, as more specifically illustrated in this example.

To a 100 ml. glass flask was added 10.6 g. of

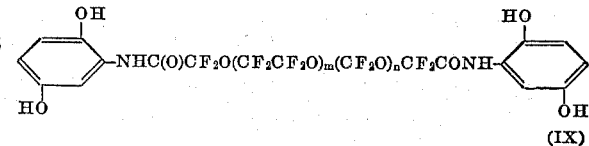

prepared as in Example II. The flask was heated at 165–175° C. in an oil bath at water aspirator vacuum for a total of 5.5 hrs. to yield 10.2 g. of a dark green oil. Treatment of a 1,1,2-trichlorotrifluoroethane solution with decolorizing charcoal gave 7.8 g. of an amber oil. Infrared analysis showed peaks characteristic of a benzoxazole besides a small absorption at 3.0 microns due to hydroxyl. Fluorine nuclear magnetic resonance (NMR) peaks are at 69.0 and 70.9φ for terminal CF$_2$ groups. $\overline{M}n$ was 2100 as measured by vapor phase osmometry in 1,1,2-trichlorotrifluoroethane. The data are consistent with the structure:

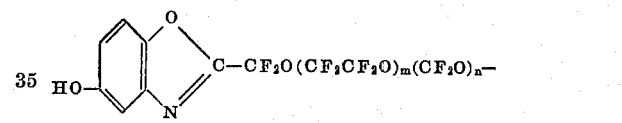

By reactions of acyl hydrazides, such as monomethacrylyl hydrazide, with the diester of Formula III, as shown in Example I, and dehydrating the resulting amide-terminated poly(perfluoroalkylene oxide) in accordance with this example, compounds such as the following can be prepared:

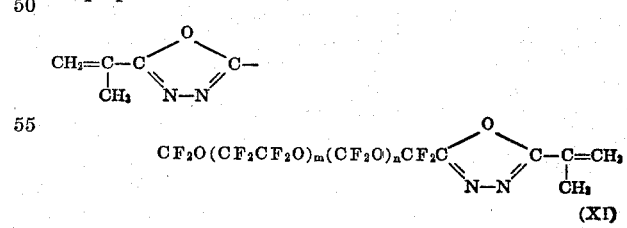

Polymerizable ester-terminated poly(perfluoroalkylene oxides) such as Compound 20 of Table I, can be prepared by reaction of an alkylene oxide, such as propylene oxide, with the diacid of Formula VII. By using an excess of the alkylene oxide, polyether terminated compounds useful as surfactants in organic solvents can be prepared.

Polymerizable ester-terminated compounds such as Compounds 19 and 21 of Table I, can conveniently be prepared by transesterification from the diester of Formula III, using mercury salts as catalysts.

EXAMPLE V

Nitrile-terminated poly(perfluoroalkylene oxides) such as Compound 22 of Table I, are useful, for example, in the preparation of triazine polymers, the preparation of which is illustrated below.

In a 500 ml. round-bottom glass flask was placed 22.8 g. (0.016 mole) of the liquid dicarbonamide

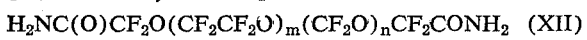

($\overline{Mn}$=1400, $m/n$=1.55), 140 g. of sand, and 57 g. (0.40 mole) of $P_2O_5$. The mixture was shaken vigorously until it became nearly free flowing, then heated in a sand bath under a vacuum of 50 mm. of mercury. The nitrile product began distilling (through a short path distilling head) when the pot temperature reached 195° C. The pressure was reduced to 20 mm. at a pot temperature of 227° C. and to 2.5 mm. at a pot temperature of 248° C. Total heating time was about 3 hrs. The yield of colorless liquid was 19.2 g., $n_D^{24}$=1.2894. Infrared absorption of the group —CN is 4.39 microns. Fluorine nuclear magnetic resonance peaks for terminal $CF_2$ groups are at 58.6 and 60.0$\phi$.

The data are consistent with the structure $$NCCF_2O(CF_2CF_2O)_m(CF_2O)_nCF_2CN \quad (XIII)$$

EXAMPLE VI

The dinitrile of Formula XIII can be converted to vinyl triazine-terminated poly(perfluoroalkylene oxide) as illustrated in this example.

In a dry 250 ml. flask was placed 45.4 g. of a dinitrile of Formula XIII (Mn=1800, $m/n$=1.4) and 100 ml. of 1,1,2-trichlorotrifluoroethane. To this stirred solution was added, during a one hour period, 10.8 g. of trifluoroacetamidine (prepared from trifluoroacetonitrile and excess ammonia) as a solution in 50 ml. of dichloromethane. Stirring was continued overnight. Removal of solvents under reduced pressure gave 45.6 g. of the desired imidoyl amidine product:

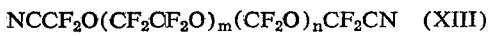

(XIV)

A solution of 20 g. of Formula XIV dissolved in 25 ml. of 1,1,2-trichloroethane, was added dropwise with stirring to 15.0 g. of acrylic acid anhydride cooled to —5° C. Heating for two days at 40° C. resulted in formation of the triazine product. Excess anhydride and by-product acrylic acid were removed by washing with aqueous potassium bicarbonate.

After washing the organic layer with dilute hydrochloric acid and removal of solvent the crude triazine product was obtained. A carbonyl impurity was removed by means of column chromatography on silica gel in 1,1,2-trichlorotrifluoroethane solution. The liquid vinyl triazine product had the following NMR absorption peaks: Proton: 2.5–4$\tau$ due to —CH=$CH_2$; fluorine: 74.7 and 76.7$\phi$ due to terminal $CF_2$; 72.4$\phi$ due to the —$CF_3$ group. Infrared analysis showed a strong band at 6.37 microns due to the triazine ring.

The data are consistent with the structure.

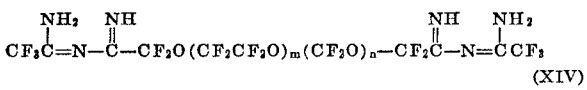

(XV)

EXAMPLE VII

In accordance with Example VI, except that a different anhydride was used, 45.6 g. of Formula XIV ($\overline{Mn}$=2100, $m/n$=0.6) was reacted with excess (23.9 g.) trifluoroacetic anhydride. The resulting crude triazine product (45.9 g.) after removal of excess anhdyride and acid under vacuum was purified by column chromatography on silica gel using 1,1,2-trichlorotrifluoroethane as eluting solvent. In this manner, 22 g. of crude triazine (containing carbonyl impurities by infrared analysis) yielded 12.9 g. of a cloudy product, which was pure by infrared analysis. Extraction of a solution in a c-$C_8F_{16}O/C_8F_{18}$ mixture of the cloudy product with tetrahydrofuran afforded a clear triazine liquid after removal of solvent.

The product had the structure:

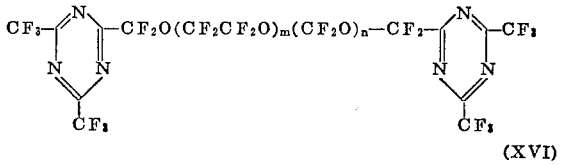

(XVI)

The product is useful as a heat transfer medium only as a hydraulic fluid for cryogenic equipment.

The fluid was heated at 250° C. at a pressure of 5 mm. Hg to remove the more volatile substituents. The residual product had the following properties:

Mol. wt. ($\overline{M}$): 4070
Pour point (ASTM): —62.5° C.
Analysis: Found: C, 20.4; F, 61.0; N, 2.1; O, 16.5
Infrared analysis: Peak at 6.4 microns
Viscosity:
  0° C.: 442.4 centistokes
  38° C.: 111.5 centistokes
  55° C.: 70.6 centistokes
  68° C.: 52.3 centistokes
  99° C.: 29.9 centistokes
  232° C.: 6.72 centistokes
ASTM Slope (between 38 and 99° C.): 0.36

Thermal stability: a 1 g. sample of triazine was heated a total of 1344 hours at 232° C. in an open glass tube with no significant change in the infrared spectrum and only a 11.8% loss in weight. The sample remained clear and colorless.

Volatility: Thermogravimetric analysis (20° C. rise per minute) gave these results:

| Wt. loss, percent: | Temp. (° C.) |
| --- | --- |
| 25 | 381 |
| 50 | 458 |
| 75 | 498 |
| 100 | 534 |

The above properties of flat viscosity temperature curve and thermal stability, combined with the exceptional fluidity at low temperatures are characteristic of most of the derivatives of the poly(perfluoroalkylene oxides) described herein, and make then generally useful as lubricants, hydraulic fluids, or viscosity index improvers for perhalogenated lubricants.

EXAMPLE VIII

Hydroxy - terminated poly(perfluoroalkylene oxides such as Compounds 24 and 25 of Table I, can be prepared for example, by reduction of the diester of Formula III, as illustrated in this example.

Powdered lithium aluminum hydride (1.9 g., 0.05 mole) was added to 120 ml. of dry diethyl ether in a 500 ml., three-necked flask fitted with a mechanical stirrer, a reflux condenser fitted with a calcium sulfate drying tube, and gas-inlet tube, and the mixture stirred 4 hrs. under dry nitrogen. Fifty ml. of an ether solution of the methyldiester of Formula III ($\overline{Mn}$, 1800 and $m/n$, 1.4/1) was added to the stirred solution of lithium aluminum hydride at a rate sufficient to maintain a gentle reflux. After all the ester had been added, the resulting mixture was heated at reflux overnight. Anhydrous methyl alcohol (20 ml.) was added to decompose the excess hydride, followed by addition of dilute sulfuric acid (37 g. of 36 N $H_2SO_4$ in 100 ml. of water). The aqueous and organic layers were separated and the aqueous layer extracted 4 times with diethyl ether, and the resulting ether fractions and the organic layer combined and dried over calcium sulfate. The calcium sulfate and ether were removed from the combined ether fractions yielding 32.5 g. of water-white, liquid methyl 101-terminated poly(perfluoroalkylene oxide),

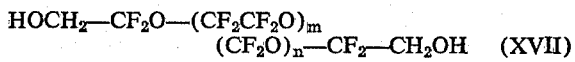

which was found to have a $\overline{M}_n$ of about 1800, a hydroxyl equivalent weight of 975±50, and $T_g$ of −107° C.

EXAMPLE IX

Another type of hydroxy-terminated poly(perfluoroalkylene oxide), containing more than one hydroxyl group on each terminating radical, was prepared as shown in this example.

To a 500 ml. round bottom glass flask was charged 105 g. of a Formula XVII compound, ($\overline{M}_n$=2000, $m/n$=0.6). The system was degassed and blanketed with $N_2$, then 5.25 ml. of a $NaOCH_3$ solution in methanol (4.85 meq./g.) was added through a syringe with magnetic stirring. Methanol was removed under reduced pressure while the mixture was heated to 65° C. The system was again blanketed with $N_2$, cooled to 45° C., and 1.85 g. of glycidol was added. After the mixture was stirred at 90° C. for 1½ hours it was cooled, diluted with 150 ml. $CF_2ClCFCl_2$ and washed with 10 ml. of 10% aqueous $H_2SO_4$. The solution was dried, filtered and concentrated. After a final heating to 95° C. at 0.8 mm. Hg the product was filtered through a sintered glass funnel to remove trace contaminants. 98.5 grams (92.5%) of a yellow clear product was obtained, a 50% solution of

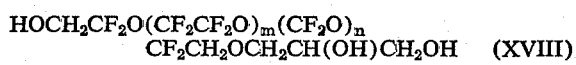

in unreacted Formula XVII diol. By using a 2:1 mol ratio of glycidol to Formula XVII diol instead of the 0.5:1 illustrated above, a completely di-substituted product was obtained. The product is useful as a crosslinking agent for urethane or polyester polymers.

EXAMPLE X

This example illustrates the preparation of an epoxy-terminated poly(perfluoroalkylene oxide).

To a 100 ml. glass flask was added 10 g. (00.055 mol) of a dicarbinol of Formula XVII ($\overline{M}_n$=1800), 25 ml. of 1,1,2-trichlorotrifluoroethane, 15 ml. of 1,2-dimethoxyethane, and 0.64 g. (0.013 mol) of sodium hydride (50% in mineral oil). The mixture was refluxed for one hour. To this refluxing gelatinous mixture was added 2.4 g. of 1-bromo-2,3-epoxypropane in 5 ml. 1,2-dimethoxyethane over 5 minutes. The mixture began to clear and a solid began building up on the flask walls during the 2 hours reflux time. The cooled clear solution was decanted from solids, washed three times with water and concentrated under vacuum to yield 5 g. (∼50% yield) of pale yellow liquid, $n_D^{24}$=1.3133. Proton nuclear magnetic resonance absorption peaks are as follows: 8.2τ, 6.4τ, 7.0τ, 7.4τ. These data are consistent with the structure:

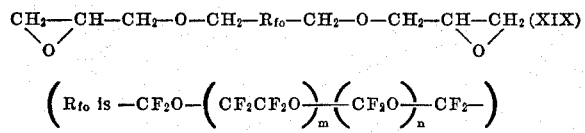

The diepoxide was polymerized to a solvent resistant elastomer useful for low-temperature gaskets by heating with 1-5% triethylenediamine or $(CF_3SO_3)_2Zn$ at about 100° C. for eight hours. Heating the diepoxide with an equimolar amount of Formula XXIV diamine and 5% tris-dimethylaminomethylphenol for 16 hours at 140° C. produced a cross-linked elastomer suitable as a cryogenic sealing material.

EXAMPLE XI

This example illustrates the preparation of an aminoester-terminated poly(perfluoroalkylene oxide).

In a dry 500 ml. flask was placed 50 g. of Formula XVII dicarbinol ($\overline{M}_n$∼2000), 11 g. of isatoic anhydride (M.P. 240-242° C.), recrystallized from ethanol), 250 ml. of redistilled benzotrifluoride, 10 ml. of dry dimethylsulfoxide and 0.5 ml. triethylamine catalyst. The mixture was refluxed (water condenser connected through a bubbler and drying tube) for 15.5 hrs. There was some foaming initially due to carbon dioxide evolution, but gas evolution slowed as the reaction proceeded. The pale yellow homogeneous reaction mixture was concentrated under water aspirator vacuum. 1,1,2 - trichlorotrifluoroethane (300 ml.) was added to the liquid residue and then the mixture filtered to separate excess isatoic anhydride. The filtrate was washed with two 100 ml. portions of water, treated with sodium sulfate, filtered and concentrated under vacuum and finally filtered under vacuum through a fine porosity sintered glass funnel to yield 51.5 g. (92%) of a pale yellow, clear liquid. Infrared bands are 2.86 and 2.94 microns for $NH_2$ and 5.85 microns for C=O of the ester function. Proton nuclear magnetic resonance peaks are as expected: 2–3.6τ complex for aromatic hydrogen, 4.58τ (broad) due to $NH_2$, and 5.40τ (triplet) for methylene in —$OCF_2CH_2O$—.

These properties are consistent with the structure:

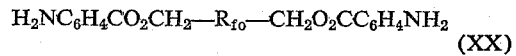

EXAMPLE XII

This example illustrates the preparation of a diester suitable for formation of polymers by reaction with, for example diamino or dihydroxy compounds, as well as an intermediate for formation of other difunctionally substituted poly(perfluoroalkylene oxides).

A mixture consisting of 38.9 grams of 2000 molecular weight alpha, omega-dihydroxy perfluoroether polymer of Formula VIII ($m/n$ of 0.6) ml. $CF_2ClCFCl_2$ and 5.2 grams of triethylamine was charged to a 100 ml. reaction vessel fitted with a gas inlet, stirrer and a condenser cooled to −78° C. The solution at 15° C. was saturated with $CF_3SO_2F$ gas. Addition of the $CF_3SO_2F$ was achieved by condensation of the gas. The solution was warmed to room temperature and excess $CF_3SO_2F$ gas was removed under reduced pressure. The solution was washed with 30 ml. of 5% HCl, then 30 ml. of a saturated NaCl solution. After drying the solution with anhydrous magnesium sulfate, the solvent was removed by distillation to 8–9 torr at 55° C. The yield of the disulfonate ester, a clear, mobile, colorless liquid of formula

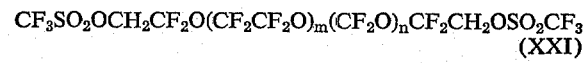

was 40.0 grams. The infrared adsorption spectrum showed bands at 6.95 microns characteristic of the sulfonate ester.

EXAMPLE XIII

This example illustrates the preparation of an aromatic amino substituted poly(perfluoroalkylene oxide).

In a dry 250 ml. flask was placed 10 g. (0.006 mole) of the trifluoromethanesulfonate ester (Formula XXI, $\overline{M}_n$=2200, $m/n$=0.6), 2.65 g. of an anhydrous mixture (4:1 molar ratio) of sodium p-nitrophenoxide and p-nitrophenol (containing 0.013 mole of the sodium salt), 125 ml. of redistilled benzotrifluoride and 5 ml. of dry dimethylsulfoxide. The mixture was stirred magnetically and refluxed for a total of 40 hours and stripped under water aspirator vacuum at about 60° C. The residual amber liquid was dissolved in about 200 ml. of 1,1,2-trichlorotrifluoroethane and the organic solution washed several times with water, dried over anhydrous sodium sulfate, filtered and concentrated at the aspirator and finally at 0.1 mm. Hg pressure on the steam bath. The residual pale yellow oil weighed 6.5 g. Infrared analysis and proton and fluorine nuclear magnetic resonance spectra were consistent for the expected nitrophenoxymethyl derivative; NMR peaks were found at 77.5 and 79.6$\phi$, 5.56$\tau$, 3.00$\tau$ and 1.81$\tau$.

These properties are consistent with the formula:

$$O_2NC_6H_4OCH_2—R_{fo}—CH_2OC_6H_4NO_2 \quad (XXII)$$

A solution of 8.6 g. of the dinitro compound in 30 ml. trifluoroethanol was hydrogenated in a Parr apparatus in the presence of 0.12 g. platinum oxide. The reaction mixture was subjected to vigorous shaking and about 50 p.s.i. hydrogen gas pressure over a 0.5 hr. period at room temperature. After centrifuging to remove catalyst, evaporation of solvent under vacuum gave 8.0 g. of a pale amber oil, which darkened slowly on exposure to air. The equivalent weight of the diamine product measured as 1090 by titration.

Infrared analysis and NMR resonance absorption at 78.3 and 80.5$\phi$, 5.28$\tau$, 3.30$\tau$, and 3.52$\tau$ are consistent with the structure:

$$H_2NC_6H_4OCH_2—R_{fo}—CH_2OC_6H_4NH_2 \quad (XXIII)$$

EXAMPLE XIV

This example illustrates the preparation of an aliphatic diamino-terminated poly(perfluoroalkylene oxide). 20.0 grams of the alpha, omega disulfonate ester perfluoroether polymer of Formula XXI ($\overline{M}_n=2200$, $m/n=0.6$) and 5.0 grams of liquid anhydrous ammonia were charged into a glass pressure vessel cooled to 78° C. The pressure vessel was heated at 100° C. for 5 hours, then cooled and opened. The contents, which consisted of 2 layers, were diluted with 50 cc. of $CF_2ClCFCl_2$. The bottom layer was washed with water and dried over anhydrous magnesium sulfate. The solvent was evaporated under reduced pressure, finally bringing the temperature to 100° C. at 1 torr. The product was filtered through sintered glass to remove trace contaminants. 16.4 grams (93.8%) of a slightly yellow clear liquid of formula:

$$NH_2CH_2CF_2O(CF_2CF_2O)_m(CF_2O)_nCF_2CH_2NH_2 \quad (XXIV)$$

was obtained.

Titration with $CF_3SO_3H$ gave an amine equivalent weight of 1140. The infrared absorption spectrum showed a new band at 2.95 microns for the $NH_2$ group, and the absence of the sulfonate band. Elemental analysis showed sulfur content under 0.001%.

Polyamine copolymers can be prepared, for example by reaction of a Formula XXIII compound with a difunctional alkylating agent such as an alpha-omega disulfonate ester such as Formula XXI, $$CH_3SO_2OCH_2C_6H_4—O—C_6H_4CH_2OSO_2CH_3,$$

1,10-decane dibromide, and the like.

Polymeric Schiff bases can be prepared by reaction of aliphatic or aromatic dialdehydes or diketones such as phthaloyl dialdehyde or adipaldehyde, free of other amine-reactive groups, with polyether diprimary amines such as Compounds 4 and 31 of Table I. Similarily, such polymers may be prepared by reaction of an aldehyde-terminated poly(perfluoroalkylene oxide) such as Compound 47 of Table I with diprimary amines such as Compounds 4 or 31, hexamethylene diamine, benzidine, and the like.

EXAMPLE XV

This example illustrates the preparation of an acrylate-terminated poly(perfluoroalkylene oxide) and its polymers.

A mixture consisting of 25 g. of a Formula XVII dicarbinol, 2.9 g. of triethylamine, and 100 ml. of Freon-113 was stirred in a round bottom glass flask and 2.9 g. of purified methacrylyl chloride was added dropwise. There was an immediate exotherm and formation of a white precipitate (triethylamine hydrochloride). Stirring was continued for 6 hours. The resulting mixture was filtered to remove the white solid and the filtrate evaporated to leave 21.2 g. of colorless oil. This was characterized as:

$$CH_2=C(CH_3)COOCH_2CF_2O(CF_2CF_2O)_m$$
$$(CF_2O)_nCF_2CH_2OCOC(CH_3)=CH_2 \quad (XXV)$$

by its infrared absorption spectrum which had bands at 5.8$\mu$ (ester) and 6.2$\mu$ (double bond). The OH band at 2.9$\mu$ was absent.

A mixture consisting of 10.0 g. of Compound XXV, 40 g. of xylenehexafluoride, 0.1 g. of azobisisobutyronitrile (free radical initiator) and 0.15 g. of octylmercaptan (molecular weight modifier) were placed in a glass bottle. The bottle was purged of air and blanketed under nitrogen, and sealed. It was heated to 65° C. for 16 hrs. while gently shaken. The resulting solution was evaporated to leave a soft clear elastomeric material which showed plastic flow at room temperature. This polymer exhibited a $T_g$ of $-125°$ C.

Other acrylic monomers can be made from hydroxyl-terminated or amino-terminated poly(perfluoroalkylene oxides) such as Compound 3, Table I, or the diamine XXIV, by reaction with an acrylic acid halide or anhydride in the presence of a tertiary amine. These monomers can be utilized in the same manner as exemplified above.

These acrylic monomers may be co-polymerized with other monomers such as alkyl acrylates or methacrylates to modify the physical properties of the final product. Other acrylic monomers containing reactive functional groups may be incorporated, usually in amounts of 10% by weight or less, into the polymers formed from the poly(perfluoroalkylene oxide) acrylic monomers. For example, glycidyl acrylates, 3-(triethoxysilylpropyl) acrylates, N-methylol acrylamide and acrylyl halides may be incorporated to improve adhesion to substrates and to provide covalently bound curing sites, to provide polymers curable by heat, acid catalysts or moisture.

EXAMPLE XVI

This example illustrates the preparation of a polyurethane from a hydroxy-terminated poly(perfluoroalkylene oxide).

A polyurethane was prepared by mixing 2.39 g. of the Formula XVII prepolymer with 0.41 g. of tetrafluorophenylene diisocyanate in a 5 ml. beaker at 25° C. and then further heating for about 2¼ hrs. at 80° C. with frequent mixing. The resulting mixture was cast in a mold to form a bar, the cast gelling in 4–5 hrs. at 80° C. and becoming tack-free overnight. The cure of the sample bar was completed by heating at 125° C. for 24 hrs. The resulting cured polyurethane elastomer was found to have a density of 1.88 g./cc. Shore A-2 hardness of 50, $T_g$ of $-100$ to $-86°$ C., a tensile strength of 966 p.s.i., and an elongation of 850%.

EXAMPLE XVII

This example illustrates the preparation of a polyurethane from a mixture of a hydroxy-terminated poly(perfluoroalkylene oxide) and an isocyanate-terminated poly(perfluoroalkylene oxide).

A polyurethane was prepared by mixing 0.6 g. of

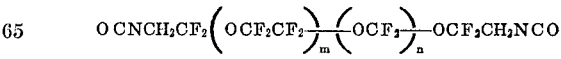

$\overline{M}n=740$, $m/n=0.8$, with 0.75 g. of the dicarbinol of Formula XVIII and 0.757 g. of polycarbinol of Formula XVII in amounts to achieve an NCO/OH ratio of about 1.01. The homogeneous mixture was cast into a mold and heated at 80 to 120° C. until the sample was tack-free. The resulting cured polyurethane elastomer was flexible at $-78°$ C. and showed no loss of strength when heated for 6 days at 300° F.

EXAMPLE XVIII

This example illustrates the preparation of a polyurethane from a hydroxy-terminated poly(perfluoroalkylene oxide).

Two moles of the methylol-terminated prepolymer of Formula XVII was reacted with 1 mole of glycidol in the presence of sodium methoxide. The reaction mixture was heated to 90° C. and held at that temperature for 1.5 hrs., after which the mixture was allowed to stand and cool overnight. The reaction mixture was dissolved in trichlorotrifluoroethane (Freon–113). The solution was washed with 10% aqueous sulfuric acid and then washed with saturated aqueous sodium chloride and dried over magnesium sulfate. The dried solution was filtered and concentrated under reduced pressure to yield a yellow liquid hydroxy-terminated prepolymer; it had an equivalent weight of 830 and hydroxyl functionality of 2.4.

One gram of the above-prepared prepolymer product, 1.0 g. of the methylol-terminated prepolymer of Formula XVII 0.010 g. of a 3% solution of dibutyl tin diacetate in acetone, and 0.175 g. of oxy-bis(ethylisocyanate), $$O(CH_2CH_2NCO)_2,$$

were mixed and heated at 60° C. After 20 min. of intermittent stirring, the mixture was homogeneous and clear. It gelled in 1 hr., became tack-free in 4 hrs. and cured in 48 hrs. at 60° C. The resulting polyurethane rubber was flexible and did not break when bent repeatedly at −78° C.

EXAMPLE XIX

This example illustrates the preparation of a polyester-polyurea from an amino-terminated poly(perfluoroalkylene oxide).

A polyester-polyurea was prepared by mixing 2.4 g. of the amino-terminated poly(perfluoroalkylene oxide) of Formula XX with 0.2 g. of a 20/80 mixture of cyclohexane triisocyanate and hexamethylene diisocyanate in a beaker at 24° C. The sample was cast into a mold and cured by heating 68 hours at 80° C. The resulting polyester-polyurea elastomer was found to have a Shore A–2 hardness of 70, $T_g$ of −125 to −112° C., a tensile strength of 1170 p.s.i. and an elongation of 280%.

The product can be used as a structural adhesive for cryogenic equipment.

EXAMPLE XX

This example illustrates the preparation of a polyamide-polyisocyanurate from an isocyanate-terminated poly(perfluoroalkylene oxide).

A polyamide-polyisocyanurate elastomer was prepared by mixing 99 parts of the isocyanate-terminated poly(perfluoroalkylene oxide) of Formula VIII and 1 part of an isocyanate trimerization catalyst at 23° C. The liquid mixture was poured into a mold and heated for sixteen hours at 100° C. The resulting tough elastomer was found to have a $T_g$ of −125 to −115° C., a tensile strength of 350 p.s.i. and an elongation of 180%. The polyamide-polyisocyanurate elastomers have utility as sealants and cryogenic adhesives.

The isocyanate trimerization catalyst was prepared by heating a mixture of trihexylene glycol borate (7 g.) and the sodium salt of 2,6-di-t-butyl-p-cresol (2 g.) for fifteen minutes at 120° C.

EXAMPLE XXI

This example illustrates the preparation of a polyether-polycyanurate from a cyanate-terminated poly(perfluoroalkylene oxide).

A 14 g. sample of 4,4'-oxydiphenol was partially neutralized with 1.2 g. of sodium hydroxide in methanol followed by evaporation to dryness under vacuum.

Following the alkylation procedure of Example XIII, the above salt was reacted with 30 g. of the trifluoromethane-sulfonate ester-terminated poly(perfluoroalkylene oxide) of Formula XXI. A total of 24.1 g. of the desired $—CH_2OC_6H_4OC_6H_4OH$ terminated poly(perfluoroalkylene oxide) was obtained as a waxy solid. Reaction of this product with excess cyanogen bromide/triethylamine in acetone at −30° C. afforded the corresponding cyanate-terminated poly(perfluoroalkylene oxide). The infrared absorption spectrum shows an absorption peak at 4.4 microns, characteristic of the —OCN group.

A sample of the $—CH_2OC_6H_4OC_6H_4OCN$ terminated polymer was poured into a mold and heated for 1.5 hrs. at 150° C. and 2.25 hrs. at 200° C. The resulting polyether-polycyanurate was a flexible rubber with 150% elongation and 615 p.s.i. tensile strength.

EXAMPLE XXII

This example illustrates the preparation of polybenzoxazole-polycyanurate from a cyanate-terminated poly(perfluoroalkylene oxide).

Reaction of the hydroxy-terminated poly(perfluoroalkylene oxide) of Formula X with excess cyanogen bromide/triethylamine in acetone at −30° C. afforded the corresponding cyanate-terminated poly(perfluoroalkylene oxide) having an absorption at 4.4 microns in the infrared absorption spectrum. Heating this material for three weeks at 150° C. resulted in a dark colored rubber, a polybenzoxazole-polycyanurate.

Block copolymers comprising heterocyclic units or segments linking the poly(perfluoroalkylene oxide) segments are generally characterized by good high temperature stability combined with good resilience at low temperatures. Polybenzoxazoles can be prepared by condensing equimolar amounts of activated esters, such as compounds of Formula V, or the acyl halide-terminated poly(perfluoroalkylene oxide), with bis(ortho-hydroxy aromatic amines) and then dehydrating the product polyamide. Polybenzimidazoles can be similarly prepared by reaction with bis(ortho-amino aromatic amines) and dehydration. Polyoxadiazoles can be prepared by reaction of, for example, the diester of Formula III with excess hydrazine, followed by reaction of the hydrazine-terminated prepolymer with an equimolar amount of an activated ester of Formula V and dehydration of the resulting polyhydrazide by heating to 200–300° C. under vacuum.

The high molecular weight flexible thermoplastic products are valuable as solvent-free adhesives useful over wide ranges of temperatures.

EXAMPLE XXIII

This example illustrates the preparation of a polytriazine from a nitrile-terminated poly(perfluoroalkylene oxide).

A sample of the nitrile-terminated poly(perfluoroalkylene oxide) of Formula XIII was mixed with 5–10 mole percent of anhydrous ammonia as catalyst in a glass ampoule and the ampoule sealed. The ampoule was heated for one day at 150–200° C. and then cooled and opened. The resulting polytriazine was a highly resilient, crosslinked rubber having a $T_g$ of −82 to −75° C. and a rebound resilience of 90.4% at 23° C. The polytriazine rubber lost only 2.3 weight percent when heated at 260° C. for 25 days.

EXAMPLE XXIV

This example illustrates the preparation of a polycarbonate from a hydroxy-terminated poly(perfluoroalkylene oxide).

To a 100 ml. resin pot fitted with mechanical stirrer, a gas bubbler tube, a vent tube, and a thermometer was added 17 g. (0.01 mol) of the diol of Formula XVII, $\overline{M}n=2000$, $m/n=0.6$, 25 ml. of pyridine and 25 ml. of chlorobenzene. The vessel was purged with nitrogen for ten minutes. A mixture of phosgene and nitrogen was slowly bubbled into the stirred reaction mixture. As the reaction proceeded, the temperature of the mixture rose approximately 15° C. After one hour, a white precipitate appeared. The precipitate, pyridine hydrochloride, became voluminous as the reaction proceeded. After two hours, when 22 g. of phosgene had been added, the reaction mixture turned yellow and was viscous enough to nearly stop the mechanical stirrer. The mixture was poured into water and was rapidly mixed in a blender. The emulsified oil was separated and extracted with 15% hydrochloric acid at 40° C. The oil was separated again and heated at 80° C. overnight at reduced pressure (5–10 mm.). The yield of polymer was 12.2 g. The infrared spectrum was consistent with the proposed structure,

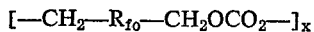

The product is useful as a hydraulic fluid for use over an extended temperature range.

EXAMPLE XXV

This example illustrates the preparation of polyimides by reaction of the diamino poly(perfluoroalkylene oxide) of Formula XXIV with a tetracarboxylic cyclic dianhydride. The resulting polyamide acid is dehydrated either by heating or by reaction with an acid anhydride to form a polyimide. In certain cases, another diprimary amine may be a co-reactant to yield a terpolymer.

1.25 g. benzophenone-3,3',4,4'-tetracarboxylic dianhydride and 0.46 g. of 4,4'-oxydianiline were placed in the micro cup of a closed high shear blender (capacity 30 ml.). The diamine of Formula XXIV ($\overline{M}n=2240$, $m/n=0.6$) (4.26 g.) and dry dimethylacetamide (24.6 ml.) were added and the blender stirred at high speed for six minutes. The resulting heavy, frothy liquid was transferred to a 4 oz. capped jar and shaken on a motorized table for 1.5 hrs. A 3-hr. heating at 65° C. allows the solution to become clear by removing froth and bubbles. This sample has an inherent viscosity of 0.36 at 0.5 g./dl. concentration in dimethylacetamide.

The solution was coated on glass plates with a knife coater and dried in a circulating air oven at 70° C. for 1 hr. The self-supporting film was removed and clamped to a Teflon sheet for final curing: 1 hr. at 100° C., 1 hr. at 150° C., and 1 hr. at 200° C. The final product is a transparent, elastomeric, orange film with a tensile strength of 2500 p.s.i. and elongation of 130%.

This film showed excellent thermal stability. It exhibited only a 1.5% weight loss after heating to 200° C. for 2 weeks; a sample of this rubbery film retains its elasticity when cooled to −78° C. It can be creased without breaking at −78° C.

Other polyimides can be prepared in a similar reaction of the diamine of Formula XXIV with pyromellitic dianhydride and aliphatic or aromatic diprimary amines. Alternatively the aromatic diamine may be omitted and the stoichiometry adjusted so the equivalent amounts of a dianhydride and the diamine of Formula XXIV are present.

Preferred solvents are dry polar aprotic solvents such as dimethyl acetamide, dimethylformamide, dimethyl sulfoxide and N-methyl pyrrolidone. Concentrations of 5% to 30% solids are preferred. Preferred reaction temperatures for the initial condensation to form the polyamic acid are −10 to 50° C.

Other polyimides can be prepared by reaction of the dianhydride of Compound 33, Table I, with an aromatic or aliphatic diamine, or with the diamine of Formula XXIV, or Compound 31, Table I, using the reaction conditions described above.

EXAMPLE XXVI

This example illustrates the preparation of polyamides by reaction of diamino-terminated poly(perfluoroalkylene oxides) with diacyl halide terminated perfluoroalkane.

In a 100 ml. round bottom glass flask, fitted with magnetic stirrer, thermometer, reflux condenser, addition funnel and drying tube, were placed 6.40 g. of the diamine of Formula XXIV ($\overline{M}n=2280$, $m/n=0.6$), 9 ml. of $CF_2ClCFCl_2$ and 1.5 ml. hexafluoroisopropanol. A solution consisting of 0.817 g. $ClOC(CF_2)_4COCl$ in 5 ml. $CF_2ClCFCl_2$ was added slowly to the flask at 40° C. Slow evolution of HCl gas was observed. The clear solution was refluxed for 3 hrs. The solvent was removed at 50° C. in a vacuum oven. A slightly opaque weak film was obtained.

The properties of the polymer of formula

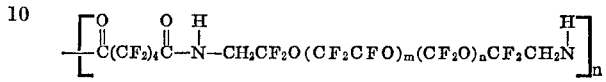

are as follows: Inherent viscosity (1%) in $CF_2ClCFCl_2$/ hexafluoroisopropanol (1:1) is 0.084. Differential thermal analysis (DTA) shows a $T_g$ of −123° C. to −111° C., and a $T_m$ of 38° C. Heat aging studies show a weight loss of 2.5% at 200° C. after 610 hrs.

Other polyamides may be prepared by reaction of aliphatic or aromatic diacid chlorides in a similar manner with the diamine of Formulas XXIII and XXIV. The diacids of Formula VII may be reacted with diisocyanates in a 1:1 stoichiometric ratio to yield polyamides with evolution of $CO_2$. Alternatively, diacide halides derived from the diacid of Formula VII can be reacted in a dry, aprotic medium with an equivalent amount of a diprimary or disecondary amine.

EXAMPLE XXVII

This example illustrates the preparation of a polyamide-polyester-polyether from a carboxy-terminated poly(perfluoroalkylene oxide).

A suspension of 20 g. of 4-aminobutyric acid in 140 ml. of a methanol solution containing 7 g. of sodium hydroxide was added, with stirring, to a solution of 100 g. of dimethylester-terminated poly(perfluoroalkylene oxide) of Formula III, ($\overline{M}n=2100$, $m/n=0.6$) in 300 ml. 1,1,2-trichlorotrifluoroethane and 100 ml. diethyl ether. The mixture was stirred at room temperature for 2 hrs., and the solvents removed under vacuum. The white powdery residue was acidified with 300 ml. portions of water. The product was given a final wash with 700 ml. acetone and dried under vacuum at 60° C. The liquid product was then dissolved in N,N-dimethylformamide, centrifuged, the solvent removed and again vacuum dried. The yield was 94 g. The acid equivalent weight of the $$—CONH(CH_2)_3CO_2H$$

terminated poly(perfluoroalkylene oxide) was 1210.

A mixture of 90 parts of the above carboxy-terminated poly(perfluoroalkylene oxide) and 10 parts of an epoxy novolak (DEN-438), Dow Chemical Company) was poured into a mold and heated for two days at 110° C. The resulting polyamide-polyester-polyether elastomer had a $T_g$ of −128 to −115° C., a tensile strength of 260 p.s.i., an elongation at break of 110%, a Shore A-2 hardness of 55 and 0% permanent set.

This polymer is useful in sealant compositions and cryogenic adhesives.

EXAMPLE XXVIII

This example illustrates the preparation of a polyether-polysiloxane from a functional silane-terminated poly(perfluoroalkylene oxide).

In a glass ampoule was placed 25 g. (22.4 meq.) of allyl-terminated poly(perfluoroalkylene oxide) (Compound 27, Table I; $\overline{M}n=2000$, $m/n=0.6$), 4.4 g. (18.4 meq.) of dimethylacetoxysilane, 0.65 g. (4.0 meq.) of methyldiacetoxysilane and 3 drops of a 3% solution of $H(PtCl_3 \cdot C_2H_2)$ in $CCl_4$. The sealed tube was heated at 80° C. for 65 hours. The liquid product, a silane-terminated poly(perfluoroalkylene oxide),

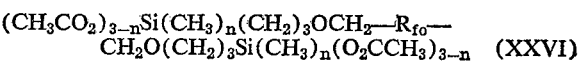

where $n=1$ and 2, is cured to a soft elastomeric gum by admixing a catalytic amount of tetraisopropyltitanate and exposing the mixture to atmospheric moisture for 6 days at about 25° C. and 1 day at 100° C. 82 parts of the soft polysiloxane vulcanizate was blended with 8 parts of finely divided silica, 10 parts of finely divided iron oxide ($Fe_2O_3$) and about 1 part of benzoyl peroxide with the aid of a small rubber mill. Curing the resulting material at 177° C. for 6 hours in a press and post-curing at 177° C. for 24 hours gave a polyether-polysiloxane rubber having a shore A–2 hardness of 36, a tensile strength of 250, an elongation at break of 140%, a density of 1.93 g./c. and a $T_g$ of —125 to —114° C.

Aryl-terminated poly(perfluoroalkylene oxides) such as Compound 56 of Table I can be used to prepare cross-linkable linear high polymers such as polyarylsulfones by, for example, reacting with Compound 57 or a disulfonyl halide such as $ClO_2SC_6H_4OC_6H_4SO_2Cl$, in the presence of a Friedel-Crafts catalyst such as indium chloride at 120–150° C. for eight hours in a cosolvent mixture such as xylene hexafluoride-nitrobenzene.

Polymeric ketones can similarly be prepared by reaction of aryl terminated poly(perfluoroalkylene oxides) with, for example, terephthaloyl chloride, in the presence of a trifluoromethanesulfonic acid catalyst.

Various modifications and alterations of this invention will become apparent to those skilled in the art without departing from the scope and spirit of this invention.

What is claimed is:

1. A thermally stable, solvent resistant polymer having a glass transition temperature below —78° C. and comprising recurrent backbone units of the formula

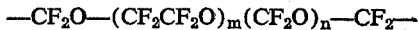

and organic linking radicals, where $m$ and $n$ designate the number of randomly distributed perfluoroethyleneoxy and perfluoromethyleneoxy backbone subunits, respectively, the ratio $m/n$ being 0.2/1 to 5/1, wherein said recurrent backbone units are joined by said organic linking radicals attached through a carbon, oxygen, sulfur or nitrogen atom thereof contained in a chain of not fewer than 3 atoms.

2. A thermally stable, solvent resistant polymer having a glass transition temperature below —78° C. and consisting essentially of recurrent backbone units of the formula

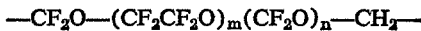

and triazine linking radicals having the formula

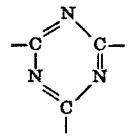

where said backbone units are joined by the carbon atoms of said triazine linking radicals, where $m$ and $n$ designate the number of randomly distributed perfluoroethyleneoxy and perfluoromethyleneoxy backbone subunits, respectively, the ratio $m/n$ being 0.2/1 to 5/1.

3. A polymer according to claim 1 wherein said organic linking radicals having the formula:

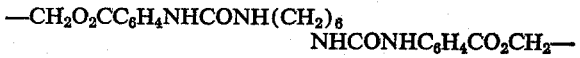

4. A polymer according to claim 1 wherein said organic linking radicals have the formula

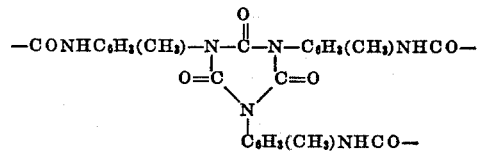

5. A polymer according to claim 1 wherein said organic linking radicals have the formula

References Cited

UNITED STATES PATENTS

| | | | |
|---|---|---|---|
| 3,475,384 | 10/1969 | Trischler | 260—77.5 |
| 3,505,411 | 4/1970 | Rice | 260—615 |
| 3,553,179 | 1/1971 | Barlett | 260—80.72 |
| 3,566,835 | 3/1971 | Grindahl et al. | 260—248 |
| 3,574,770 | 4/1971 | Paine | 260—615 |

LESTER L. LEE, Primary Examiner

U.S. Cl. X.R.

260—465.7, 485 F, 487, 561 R, 583 GG, 583 P, 593 H, 615 BF, 47 CP, 77.5 R, 46.5 R, 61, 65, 75 N, 775 AP, 77.5 CH, 78 R, 78 TF, 78.4 N, 86.1 R, 86.1 E, 89.5 H, 249.5, 249.8, 302 R, 306.8 R, 307 R, 307 G, 308 R, 309, 313.1, 464, 465.5 R

UNITED STATES PATENT OFFICE
CERTIFICATE OF CORRECTION

Patent No. 3,810,874        Dated   May 14, 1974

Inventor(s)   Ronald A. Mitsch and Joseph La Mar Zollinger

It is certified that error appears in the above-identified patent and that said Letters Patent are hereby corrected as shown below:

Column 1, line 20, "Possessing" should read -- possessing --;

Column 2, line 42, "(e.g. -c=$C_6H_{10}$-)" should read
-- (e.g. -c-$C_6H_{10}$-) --;

Column 2, line 54, " -(O)COC(O), " should read
-- -(O)COC(O)-, --;

Column 3, line 5, formula (II) should read
-- -$CF_2O$- ($CF_2CF_2O)_m$-($CF_2O)_n CF_2$- --;

Column 4, line 72, in the formula (1) for the Reactant,
" -NH " should read -- -$NH_2$ --;

Column 6, line 22, in the formula (3) for the Reactant,
" $N_2$N- " should read -- $H_2$N- --;

Column 8, line 37, " Compound 22 plus $HN_3$ " should read
-- Compound 22 plus $NH_3$ --;

Column 9, line 35, "polyesters" should read -- polyethers --;

UNITED STATES PATENT OFFICE
CERTIFICATE OF CORRECTION

Patent No. 3,810,874   Dated May 14, 1974

Inventor(s) Ronald A. Mitsch and Joseph La Mar Zollinger

It is certified that error appears in the above-identified patent and that said Letters Patent are hereby corrected as shown below:

Column 11, line 26, " Mn " should read -- $\overline{M}n$ --;

Column 13, line 45, " (00.055 mol) " should read -- (0.0055 mol) --;

Column 16, line 70, " XVII " should read -- XVIII --.

Signed and sealed this 4th day of March 1975.

(SEAL)
Attest:

RUTH C. MASON
Attesting Officer

C. MARSHALL DANN
Commissioner of Patents
and Trademarks